United States Patent
Blair

(10) Patent No.: US 7,492,448 B2
(45) Date of Patent: Feb. 17, 2009

(54) OPTICAL METHOD OF DETERMINING A PHYSICAL ATTRIBUTE OF A MOVING OBJECT

(75) Inventor: Jim Blair, Nedlands (AU)

(73) Assignee: JRB Engineering Pty Ltd., West Perth (AU)

(*) Notice: Subject to any disclaimer, the term of this patent is extended or adjusted under 35 U.S.C. 154(b) by 0 days.

(21) Appl. No.: 10/593,685

(22) PCT Filed: Mar. 21, 2005

(86) PCT No.: PCT/AU2005/000406

§ 371 (c)(1),
(2), (4) Date: Jun. 7, 2007

(87) PCT Pub. No.: WO2005/090903

PCT Pub. Date: Sep. 29, 2005

(65) Prior Publication Data

US 2007/0296949 A1    Dec. 27, 2007

(30) Foreign Application Priority Data

Mar. 19, 2004  (AU) .............................. 2004901438

(51) Int. Cl.
*G01B 11/26* (2006.01)
(52) U.S. Cl. .................................. 356/141.5
(58) Field of Classification Search ....... 356/3.01–3.15, 356/4.01–4.1, 5.01–5.15, 6–22, 28, 28.5, 356/139.01–139.1, 141.1–141.5
See application file for complete search history.

(56) References Cited

U.S. PATENT DOCUMENTS 6,630,993 B1    10/2003    Hedges et al.

(Continued)

FOREIGN PATENT DOCUMENTS

DE    10313191 A1    10/2004

(Continued)

OTHER PUBLICATIONS

McIvor A M., "Calibration of a laser stripe profiler," 3-D Digital Imaging and Modeling, 1999. Proceedings Second International Conference on Ottawa, Ontario, Canada, Oct. 4-8, 1999, Los Alamitos, CA, USA, IEEE Comput. Soc. US, pp. 92-98, Oct. 4, 1999.

(Continued)

*Primary Examiner*—Thomas H Tarcza
*Assistant Examiner*—Luke D Ratcliffe
(74) *Attorney, Agent, or Firm*—George C. Rondeau, Jr.; Davis Wright Tremaine LLP

(57) ABSTRACT

A method for optically determining a physical attribute of a moving object, such as the height h of the carbons (14) of a pantograph head (10). This method incorporates a method for optically establishing a mathematical spatial relationship between one or more cameras (26) and one or more fanned lasers (24) each capable of projecting a laser beam along a laser plane (28). The method comprises: establishing an orientation and location of each camera (26) with respect to a co-ordinate system; establishing an orientation of each laser plane (28) within the co-ordinate system; and deriving a transformation function for calculating the three dimensional position of points within the plane (28) of each respective laser beam from a pixel location within a pixelated image created by each of the cameras.

25 Claims, 13 Drawing Sheets

U.S. PATENT DOCUMENTS

2004/0095585 A1 * 5/2004 Nayebi ................. 356/601

FOREIGN PATENT DOCUMENTS

| EP | 1524494 | 4/2005 |
|---|---|---|
| JP | 08079904 | 3/1996 |
| JP | 08110807 | 4/1996 |

OTHER PUBLICATIONS

Izquierdo, M.A.G. et al., "Sub-pixel measurement of 3D surfaces by laser scanning," Aug. 30, 1999, Sensors and Actuators A, Elsevier Sequoia S.A., Lausanne, Switzerland, pp. 1-8.

* cited by examiner

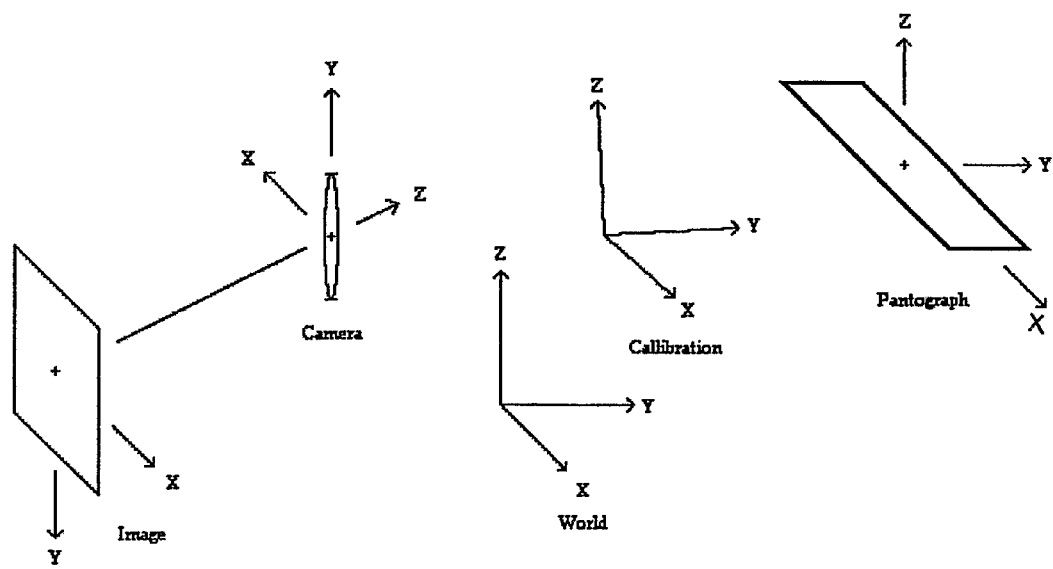
Figure 12: Reference Frames
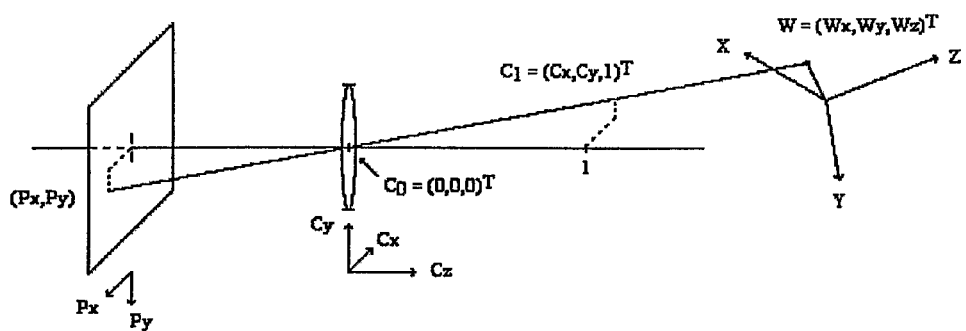
Figure 13: Coordinate Systems

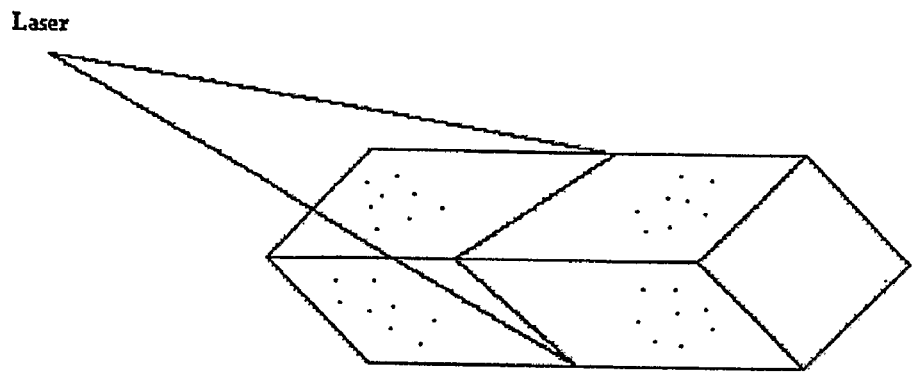
Figure 14: Calibration Block
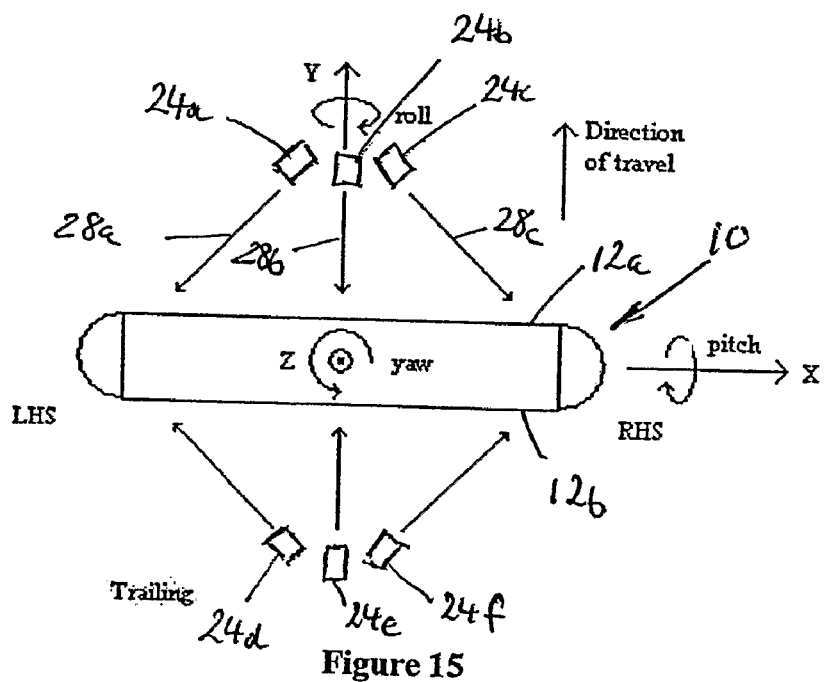
Figure 15
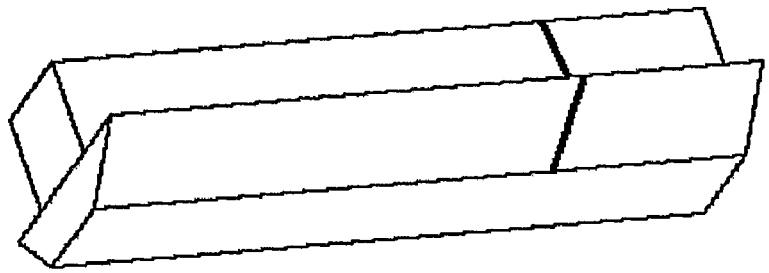
Figure 16: Stripe

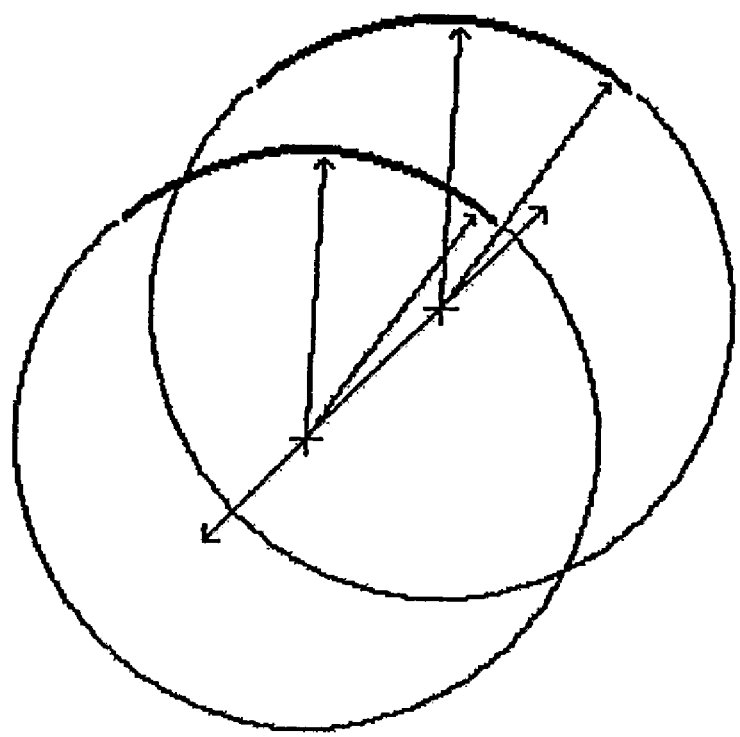
Figure 17: Fit Cylinder Profile
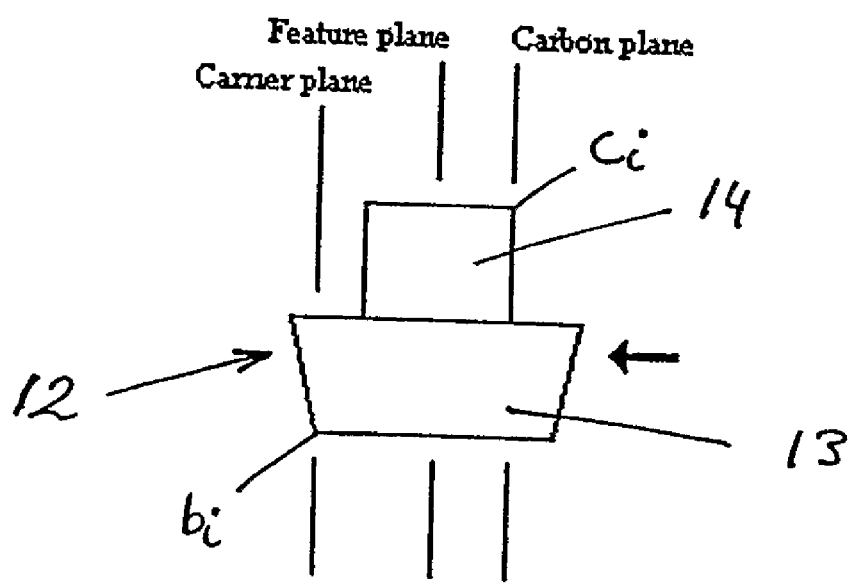
Figure 18

OPTICAL METHOD OF DETERMINING A PHYSICAL ATTRIBUTE OF A MOVING OBJECT

FIELD OF THE INVENTION

The present invention relates to an optical method for determining a physical attribute of a moving object. The present invention also relates to a method for optically establishing a mathematical spatial relationship between one or more cameras and one or more fanned lasers each capable of projecting a laser beam along a laser plane.

BACKGROUND OF THE INVENTION

A number of optical methods and systems are readily available for determining the physical attribute of an object such as the dimension of an object or its orientation. In particular, there exists a number of dynamic measuring systems based on the combination of fanned laser beams and digital cameras. A fanned laser beam emits a fan of laser rays, emanating from a centre of the laser, which all lie in a common plane; that is, the plane of the fanned laser, or the "laser plane". When the fanned laser illuminates a body, the laser rays create a line on an outer surface of the body which is the intersection of the laser plane with the outer surface of the body.

The line created by the fanned laser can be recorded by a digital camera as a two-dimensional image. If the line created by the fanned laser is recorded by a digital camera, and the fanned laser and digital camera are in a fixed position relative to each other, then it can be shown mathematically that each point in the camera's view illuminated by the laser can be resolved into a three dimensional position in any particular co-ordinates, provided the orientation of the laser plane, and the position and orientation of the camera are predefined precisely in co-ordinates related to the body being observed, and provided the camera's optical settings and characteristics are also known.

In industrial applications setting the lasers and cameras into precisely known orientations relative to the body being measured is difficult and sometimes impractical.

An object of the present invention is to provide an optical method for determining a physical attribute of an object utilising fanned lasers and digital cameras which does not require precise mechanical setup of the three dimensional location and orientation of the fanned lasers and digital cameras relative to the moving object.

SUMMARY OF THE INVENTION

According to a first aspect of the present invention, there is provided a method for optically determining a physical attribute of an object moving along a defined path, the method comprising the steps of:
  fixing one or more cameras, each camera being located to view the object when the object is at a trigger location;
  fixing one or more fanned lasers, each laser being located outside the path and projecting a laser beam along its laser plane onto the object when the object is at the trigger location, the intersection of the laser plane with the object at the trigger location being visible by at least one of the cameras;
  optically establishing a mathematical spatial relationship between the cameras and the plane of each of the laser beams;
  creating a pixelated image of the object in one or more of the cameras illuminated by the planar laser beams when the object is at the trigger location;
  selecting at least one pixel location in each image, the at least one pixel location corresponding to a point on the object illuminated by a laser beam;
  for each of the selected pixel locations, using the mathematical spatial relationship to establish the three dimensional position of the point based on the two dimensional position of the pixel location;
  using the three dimensional position of the respective point to determine the physical attribute of the object.

Preferably, optically establishing a mathematical spatial relationship further comprises:
  establishing an orientation and location of each camera with respect to a co-ordinate system;
  establishing an orientation of each laser plane within the co-ordinate system; and
  deriving a transformation function for calculating the three dimensional position of points within the plane of each respective laser beam from the pixel location within a pixelated image.

Preferably, establishing an orientation and location of each camera further comprises:
  temporarily mounting a calibration device having at least six non-collinear visible markings at known points on at least two non-parallel surfaces of the calibration device, the calibration device being positioned in the path and in view of each camera at a reference position such that each camera can view the at least six points;
  for each camera, creating a first pixelated image of the calibration device; and
  using the known position of the at least six markings relative to the co-ordinate system and the pixel locations within the first image to establish a transformation equation between pixel locations and the three dimensional co-ordinates of the calibration device at the reference position.

Preferably, establishing an orientation of each laser plane within the co-ordinate system further comprises:
  illuminating the calibration device with each laser beam to form a line along the surface of the calibration device;
  for each camera, creating a second pixelated image of the calibration device; and
  using the position of at least three non-collinear points within the line relative to the co-ordinate system and the pixel locations corresponding to the positions of the points within the second image to establish an equation defining the orientation of the laser.

The first pixelated image may also be the second pixelated image.

Preferably, a pixel location is defined to sub-pixel accuracy using image analysis techniques.

According to a second aspect of the present invention, there is provided an optical method for determining a physical attribute of an object moving along a defined path, the method comprising:
  fixing at least one fanned laser at a position outside of the path to project its laser beam onto the moving object when the moving object is at a trigger location;
  fixing at least one camera at a location to view the moving object when illuminated by the laser beam at the trigger location, each camera producing a digital image comprising an array of pixels;
  forming a calibration device comprising two planar surfaces which intersect in a line forming an edge of the device and, at least six non-collinear visible points on the planar surfaces at known locations on the calibration device defining a calibration co-ordinate system;

temporarily mounting the calibration device in the path in view of the at least one camera, and where illuminated by the at least one fanned laser;

producing an image of the device on each camera and determining for each of one or more pixel locations within the image an equation in terms of the calibration co-ordinate system, of a ray passing through a centre of lens of the camera which, when projected onto the device coincides with the pixel location;

determining an equation of a plane in the calibration co-ordinate system containing the fanned laser beam;

removing the calibration device;

taking an image of the object when illuminated by the at least one laser beam at the trigger location and utilising the laser plane equations, determining a three dimensional location in the calibration co-ordinate system of selected pixel locations of the object illuminated by the at least one laser, and from the three dimensional locations determining physical attribute of the object.

Preferably, forming said calibration device further comprises arranging said first and second planar surfaces at right angles to each other.

Preferably, forming said calibration device further comprises providing a third planar surface having a first edge coincident with an edge of said first planar surface distant said second planar surface, and a fourth planar surface having a first edge coincident with an edge of said third planar surface distant said first planar surface, and a second edge coincident with an edge of said second planar surface distant said first planar surface.

According to a third aspect of the present invention, there is provided a method for optically establishing a mathematical spatial relationship between one or more cameras and one or more fanned lasers each capable of projecting a laser beam along a laser plane, the method comprising:

establishing an orientation and location of each camera with respect to a co-ordinate system;

establishing an orientation of each laser plane within the co-ordinate system; and deriving a transformation function for calculating the three dimensional position of points within the plane of each respective laser beam from a pixel location within a pixelated image created by each of the cameras.

BRIEF DESCRIPTION OF THE DRAWINGS

In order that the invention may be more easily understood, an embodiment will now be described, by way of example only, with reference to the accompanying drawings, in which:

FIG. 12 illustrates the co-ordinate systems of major components of the system illustrated in FIGS. 4 and 5;

FIG. 13 illustrates the relationship between the co-ordinate systems of an image plane of a camera incorporated in the system, the camera, and the calibration device;

FIG. 14 illustrates a fanned laser illuminating the calibration device;

FIG. 15 illustrates the orientation of the pantograph head;

FIG. 16 is a representation of a portion of the pantograph as seen by one of the cameras in the system shown in FIGS. 4 and 5;

FIG. 17 is a schematic representation of a method for fitting a cylinder profile to the pantograph head;

FIG. 18 depicts various planes on the pantograph carbon and carrier;

DETAILED DESCRIPTION

Figure 1:
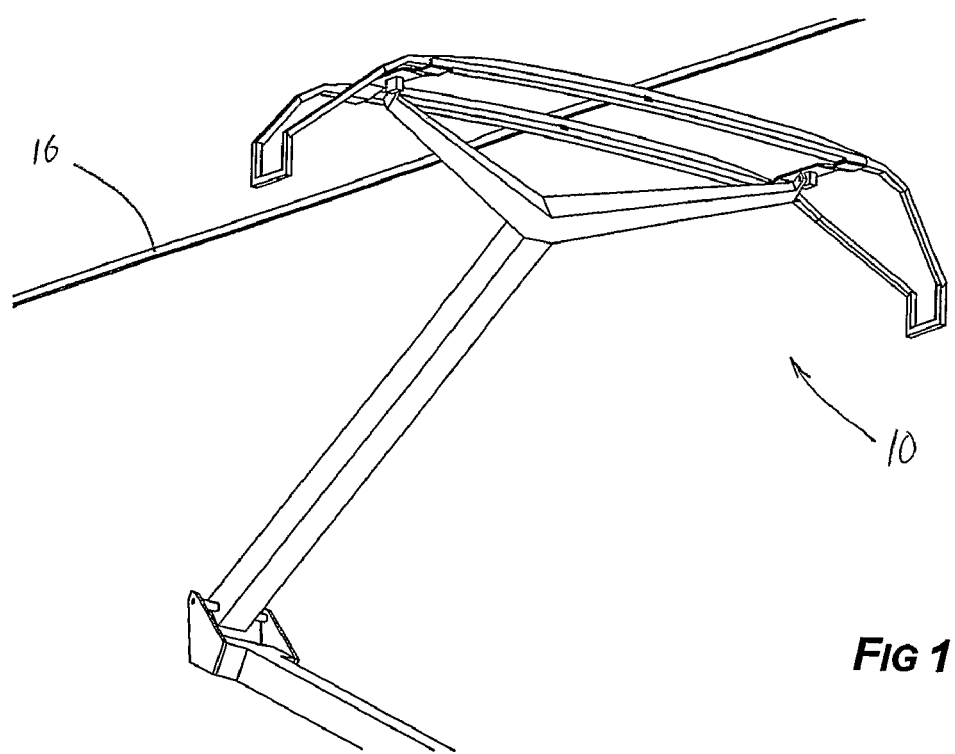
FIG. 1 is a perspective view from the side of a pantograph on the roof of an electrically powered train.
Figure 2:
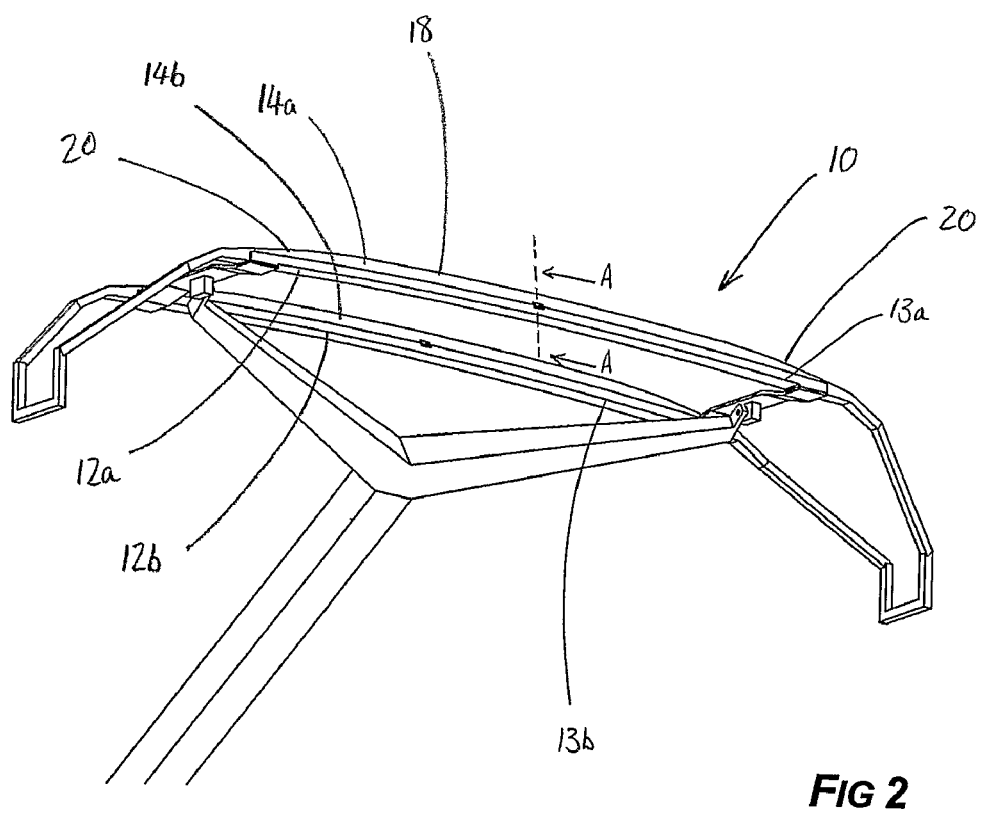
FIG. 2 is a perspective view from the front of a pantograph head.
Figure 3:
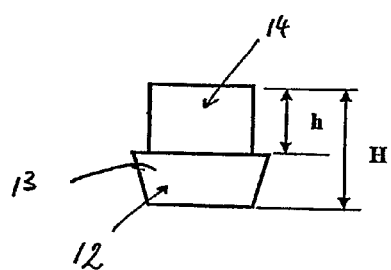
FIG. 3 is a view of section A-A of the pantograph head depicted in FIG. 2.

An embodiment of the present invention is described in relation to a pantograph of an electrically powered train. As shown in FIGS. 1 to 3, the pantograph head 10 comprises two or more parallel and spaced apart metal beams 12a and 12b (hereinafter referred to collectively as "beams 12"). Each beam 12a, 12b comprises a metal section 13a, 13b (hereinafter referred to collectively as "metal sections 13") to which carbon bushes 14a and 14b (hereinafter referred to collectively as "carbons 14") are attached. The metal sections 13 together are known as the "carrier".

The beams 12 and carbons 14 extend transversely to an overhead wire 16 from which the train derives electric current for powering its motor(s). The pantograph head 10 and wire 16 are generally orientated so that the wire contacts the carbons 14 in a region about their mid-point. The carbons 14 have a central portion 18 which comprises the majority of its length and is of uniform thickness h, and contiguous end portions 20 which reduce in thickness. In use, the wire 16 is substantially always maintained in contact with the central portion 18 of the carbons 14.

Throughout their service life, the carbons 14 wear due to contact with the wire 16, and occasionally are damaged through contact with foreign objects. The wear is reflected in a decrease in the thickness h of the carbons 14. Damage through contact with foreign objects is reflected in the removal of chunks of material from the carbons 14.

Embodiments of the present invention provide for an optical system and method for determining a physical attribute of a moving object, without requiring precise mechanical set-up of various elements of an associated optical measurement system 22. In the present embodiment, the moving object is the pantograph 10 or more particularly the carbons 14, and the physical attribute to be determined is the thickness h of the carbons 14 along their length.

Figure 4:
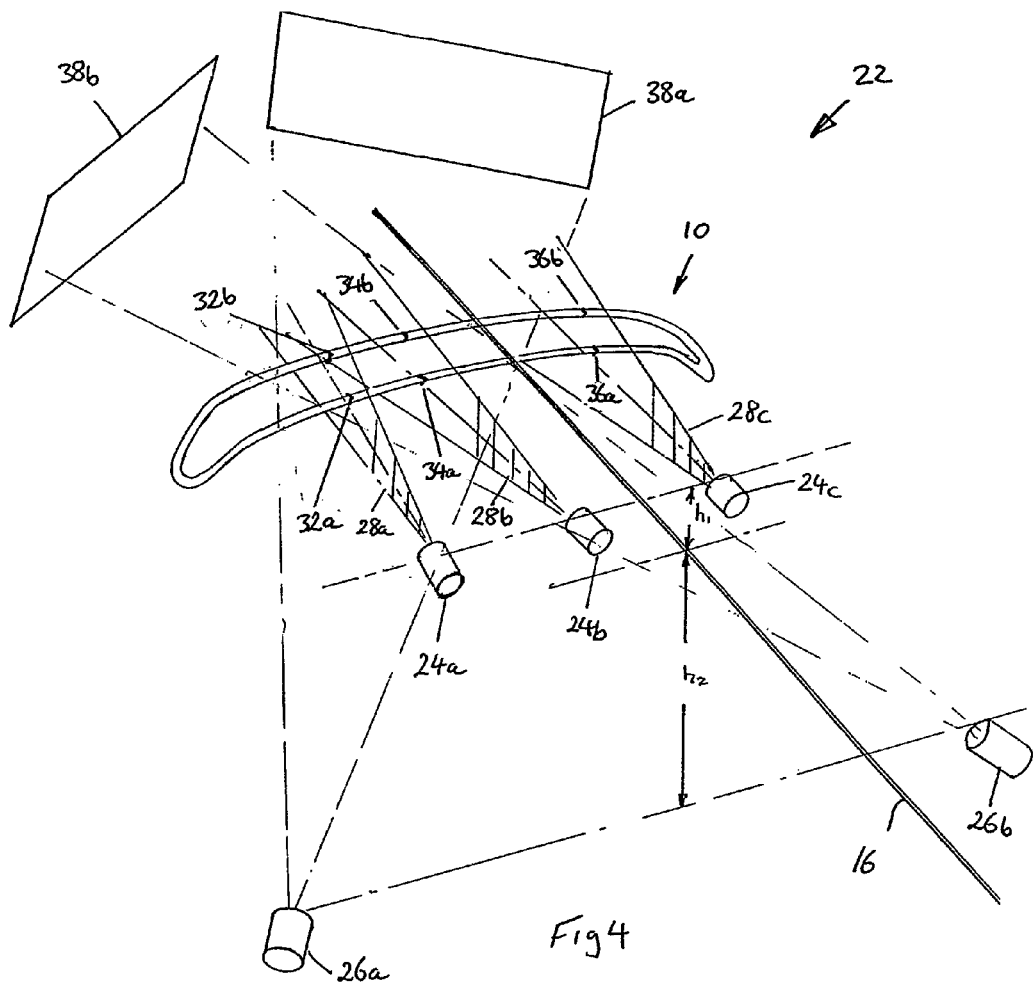
FIG. 4 illustrates an optical measurement system incorporating an embodiment of the present method.

FIG. 4 depicts the general set-up of the optical system 22. The system comprises three fanned lasers 24a, 24b and 24c (hereinafter referred to collectively as "lasers 24") which are supported at a vertical distance h1 above the wire 16; and, two digital cameras 26a and 26b (hereinafter referred to collectively as "cameras 26") which are located a vertical distance h2 below the wire 16 on either side of the pantograph head 10. Each of the lasers 24a-24c produces a corresponding laser plane 28a-28c (hereinafter referred to in general as "laser plane 28"). Each laser plane 28 is a plane containing all the laser rays emitted from the respective laser 24. The lasers 24 emit radiation of a visible wavelength and thus when the lasers 24 project light onto or illuminate the pantograph 10 they each produce two visible laser stripes 32, which correspond to the intersection of the pantograph head 10 with the respective laser plane 28. The laser 24a produces laser stripes 32a and 32b on beams 12a and 12b respectively, laser 24b produces laser stripes 34a and 34b on beams 12a and 12b respectively, and laser 24c produces laser stripes 36a and 36b on beams 12a and 12b respectively.

Each of the cameras 26 looks upwardly at the pantograph head 10 toward backboards 38a and 38b respectively which are supported above the wire 16. The camera 26a views the stripes 32a, 32b, 34a and 34b, while the camera 26b views the stripes 34a, 34b, 36a and 36b. The backboards 38a and 38b allow the cameras 26 to record a silhouette of the pantograph head 10, and in particular the carbons 14.

The lasers 24, cameras 26 and backboards 38 are all supported in locations outside of the path of motion of the pantograph 10 and the train to which it is coupled.

In addition, the lasers 24 and cameras 26 are arranged so that the laser planes 28 are not parallel to the image plane of the cameras nor passes through the camera origin. It will be appreciated that the sensitivity of the system 22 decreases as the angle between the laser plane 28 and the axis normal to the image plane approaches 0°. Preferably, the laser planes 28 are about 45° to the axis normal to image plane.

The system 22 is arranged to view the front of the pantograph 10 relative to its direction of motion. A second identical system may also be provided to view the opposite or reverse side of the pantograph head 10. This will enable measurement of the carbons 14 from opposite sides.

The following description is made in relation to only one of the cameras 26a of the system 22 as the operation of the system 22 and the associated method is identical for the camera 26b and indeed for corresponding cameras in an identical system (not shown) viewing the rear side of the pantograph head 10.

Figure 5:
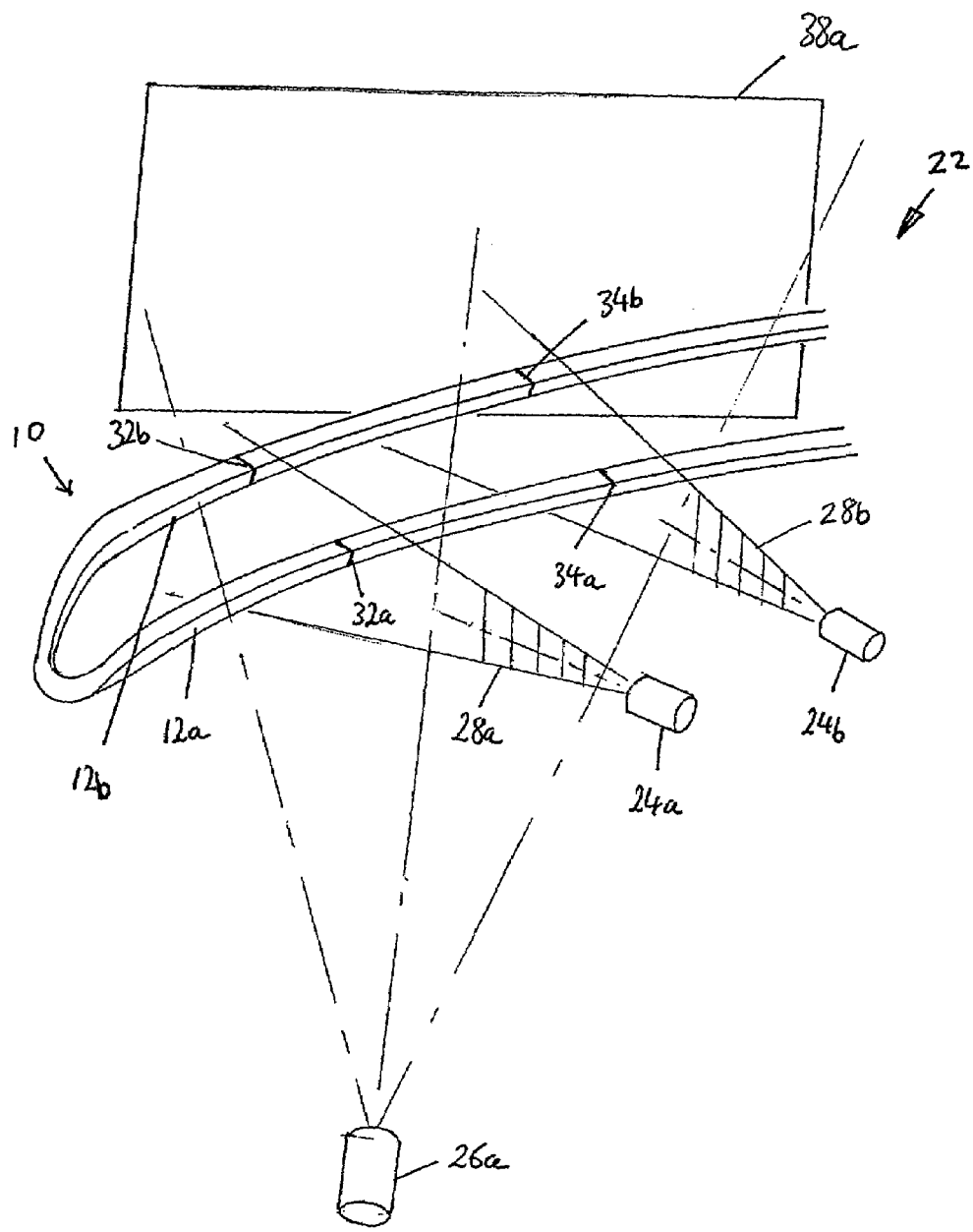
FIG. 5 is an enlarged view of the system shown in FIG. 4 from the perspective of one camera incorporated in the system.
Figure 6:
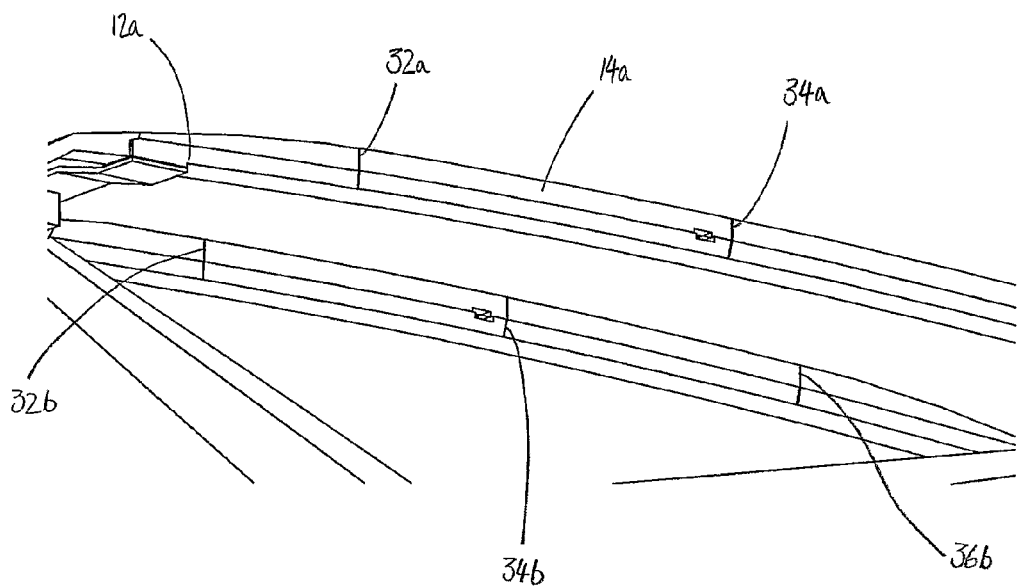
FIG. 6 is a view of a pantograph head illuminated by a plurality of fanned lasers incorporated in the system shown in FIGS. 4 and 5.

FIGS. 5 and 6 depicts the view of the pantograph head 10 as observed by camera 26a when illuminated by the lasers 24a and 24b. The camera 26a is able to see, against the backboard 38a, laser stripes 32a and 32b, 34a and 34b and 36b. However, the capture of the image of stripe 36b is not critical.

Figure 7:
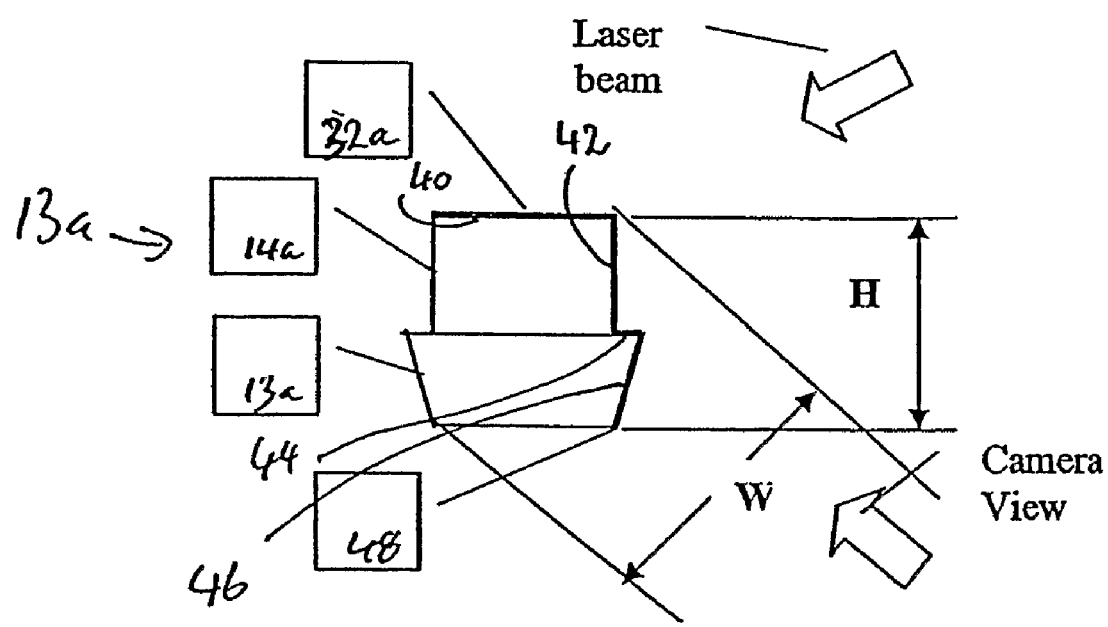
FIG. 7 is a cross-sectional view of a portion of the pantograph head as viewed by a camera in the system depicted in FIGS. 4 and 5.
Figure 8:
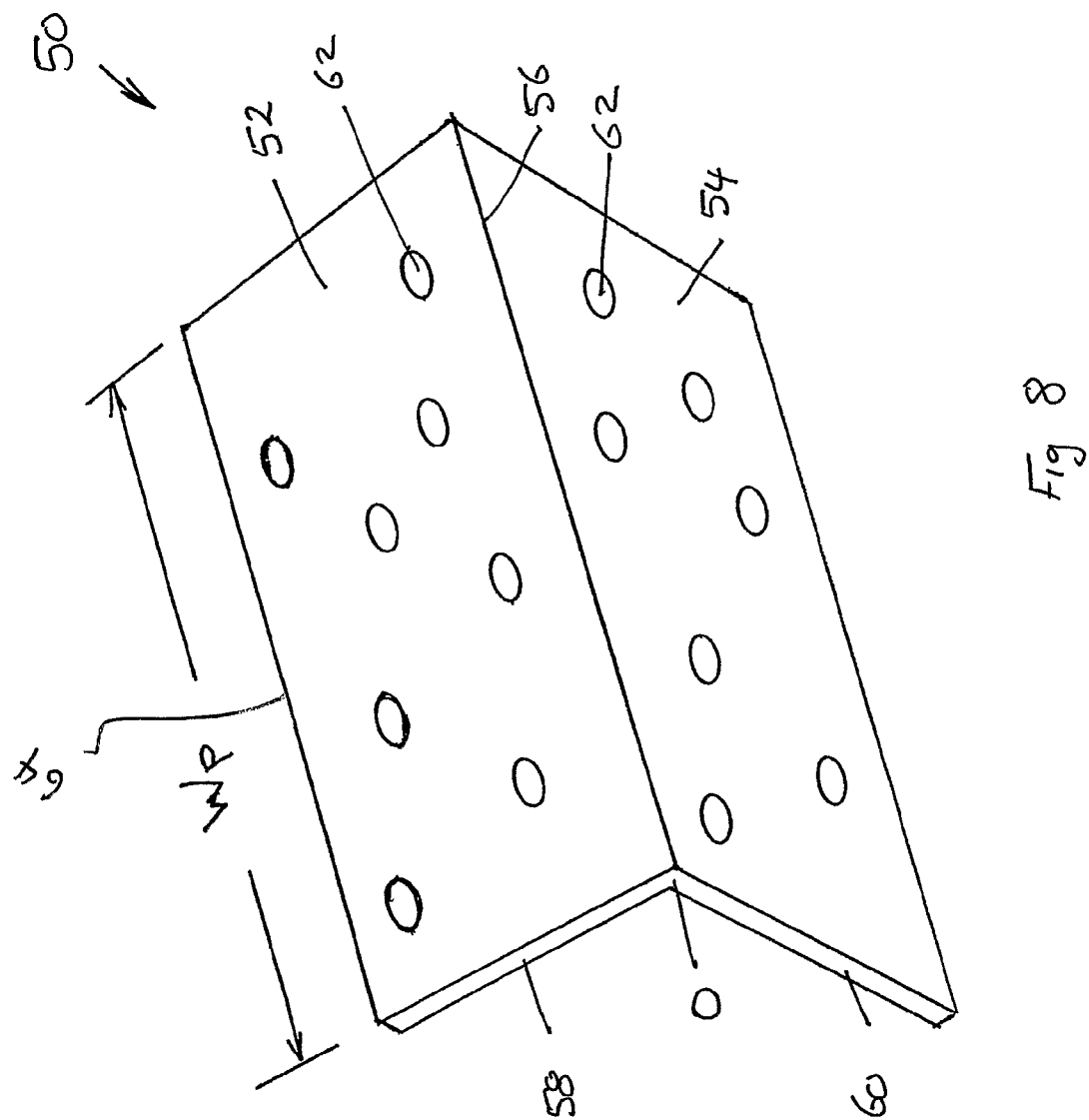
FIG. 8 is a schematic representation of a portion of the calibration device incorporated in an embodiment of the present method.

FIG. 7 depicts in cross-section the beam 12a at a location in which the beam 12a is illuminated by the laser 24a. The laser 24a produces the stripe 32a which is depicted in heavier line. This stripe 32a extends across an upper surface 40 of the carbon 14a down a front surface 42 of the carbon 14a, along an upper surface 44 of the metal section 13a and down a front surface 46 of the metal section 13a terminating at a lowest point 48.

The lowest point 48 coincides with leading or front bottom corner of the metal section 13a. The beam 12a as viewed by the camera 26a has a silhouette of a width W. However, the true height or thickness of the entire beam 12a is height H. The height H is a combination of the thickness of the metal section 13a, which remains constant throughout the life of the pantograph head 10, and the thickness h of the carbon 14a, which decreases in time due to wear.

As discussed in further detail below, knowing the location in three dimensions of the equivalent corner point 48 for each of the laser stripes 32a, 32b, 34a and 34b gives four points on the surface of the pantograph head 10. From these points, the orientation of the pantograph head 10 can be determined. Further, from the knowledge of the orientation of the pantograph head 10, relative to the camera 26a, a transformation between the silhouette width W and the height H can be derived and thus the thickness h of the carbon 14 determined.

As mentioned in the Background of the Invention, it is possible to determine the three dimensional location of a point illuminated by a laser if the position of the laser and position and direction of the camera are precisely defined relative to the body being observed. However, it will be appreciated that determining these positions particularly having regard to the lasers and cameras being located off the ground precise measurement of the location of the cameras and lasers is impractical.

Embodiments of the present invention enable such a relationship to be determined without the need to physically measure with precision the location and orientations of the lasers 24, cameras 26 and pantograph head 10. Rather, the present method utilises a calibration process and a calibration device to determine the relative orientations of the camera 26 and laser planes 28.

In the embodiment shown in FIGS. 8 to 11, the calibration device, in the form of a calibration "block" 50, comprises two planar non-parallel surfaces 52, 54, each composed of corresponding precise rectangular plates which intersect at a line or edge 56. Ideally, although not necessarily, the surfaces 52 and 54 are at right angles to each other. An edge 58 of the surface 52, and adjacent edge 60 of the surface 54, together with the edge 56 are machined to create a precise set of rectangular axes with a vertex at a corner O. In other words, edges 56, 58, 60 are mutually orthogonal and intersect at the corner O.

Each of the surfaces 52 and 54 of the calibration block 50 is provided with at least three markings in the form of dots 62 created by drilling corresponding small holes (of approximately 5 mm diameter) through the plates. Each drilled hole is filled with translucent material of visually contrasting colour to the surfaces 52 and 54 (for example the surfaces may be black in colour and the translucent material white). To highlight the dots 62, the device 50 may be backlit from the rear. The dots 62 are positioned at random or pseudo-random locations on their respective surfaces. The location of each dot 62 on the surface 52 is precisely known relative to edges 56 and 58. Similarly, the location of each dot 62 on the surface 54 is precisely known relative to the edges 56 and 60. The location of the dots 62 is held in a look up table on a computer.

In the event that the system 22 is to be used to measure the characteristics of the pantograph head 10 from both the front and the rear, the device 50 will comprise two further surfaces (not shown) of identical configuration to the surfaces 52 and 54 and attached to the surfaces 52 and 54 to form a box-like structure comprising the surface 52, the surface 54 a further surface parallel to the surface 52 and a further surface parallel to the surface 54.

In order to calibrate the system 22, the calibration block 50 is temporarily supported at a location corresponding generally to a location through which the pantograph head 10 will pass. The calibration block 50 must be stationary, in the field of view of all cameras, and in a position where all lasers 24 shine across the surfaces 52, 54. Theoretically, it is possible to set the calibration block 50 at any orientation relative to the local world co-ordinates. The orientation of the pantograph head 10 can be computed in the local world co-ordinates so long as it is possible to compute the transformation from the calibration device orientation to the local world co-ordinates.

Figure 9:
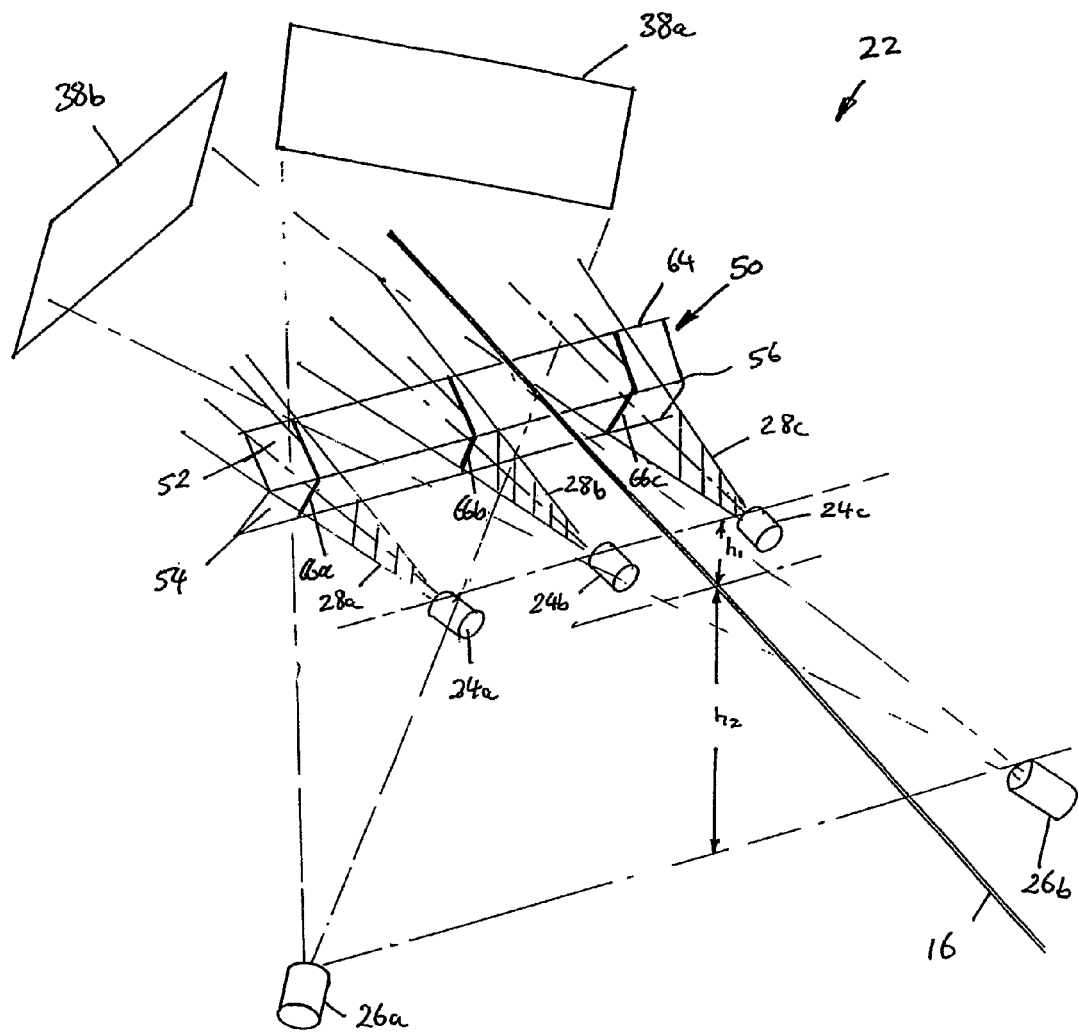
FIG. 9 is an illustration of the measurement system during a calibration process.

Calibration of the system 22 is simplified by orientating the calibration block 50 during the calibration process so that the edge 56 is generally transverse to the rails. Referring to FIG. 9, the calibration block 50 is orientated so that it is set in essentially the same as the location in which the pantograph head 10 is to be measured (the "trigger location"). Accordingly, the calibration block 50 will be placed in the path of the laser planes 28 and in view of the cameras 26. The physical location of the calibration block 50 does not need to be precise, provided it is in the field of view of the cameras 26 and is illuminated by the lasers 24. A mechanical frame (not shown) supports the calibration block 50 in a location so that the surfaces 52 and 54 are approximately at 45° to the horizontal, an upper edge 64 of the calibration block 50 contacts the wire 16 and the edge 56 of the calibration block 50 lies approximately square to the rails.

Figure 10:
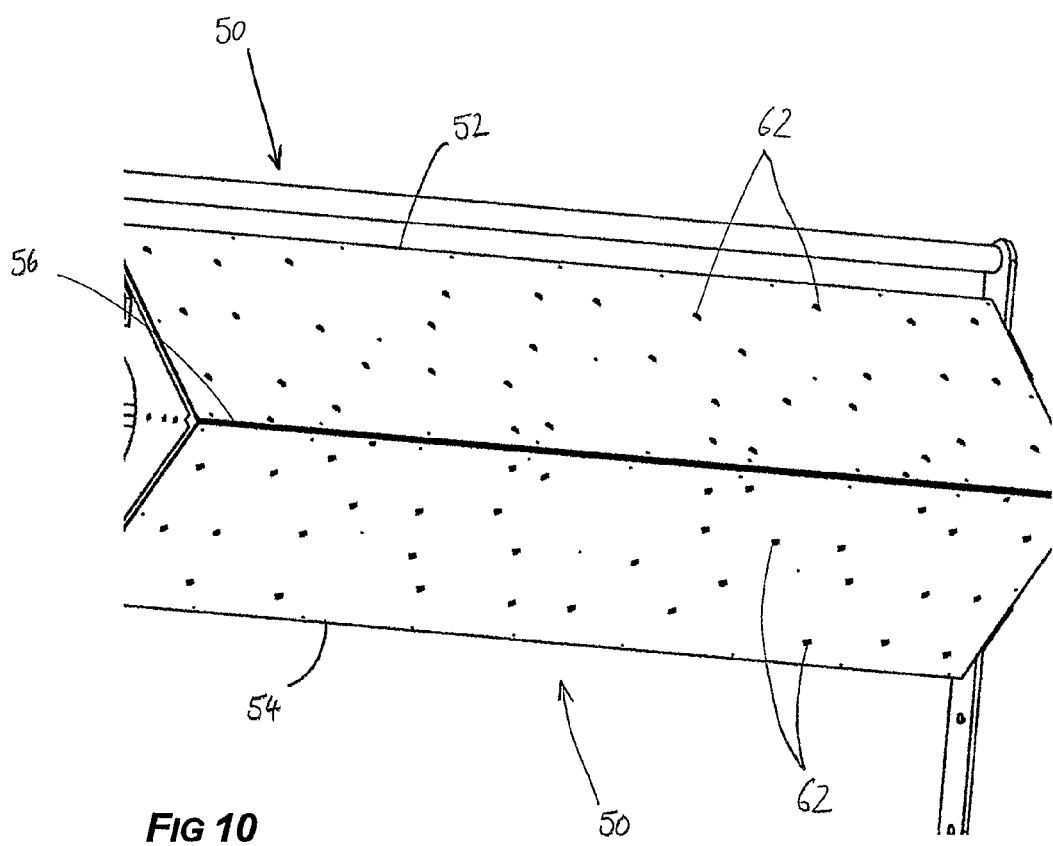
FIG. 10 is a photograph of the calibration device incorporated in the present invention when viewed from one of the cameras in the system depicted in FIGS. 4 and 5.

FIG. 10 shows an actual calibration block 50 as viewed by the camera 26a prior to illumination by the lasers 24. The dots 62 are clearly visible in an image plane of the camera 26a.

Figure 11:
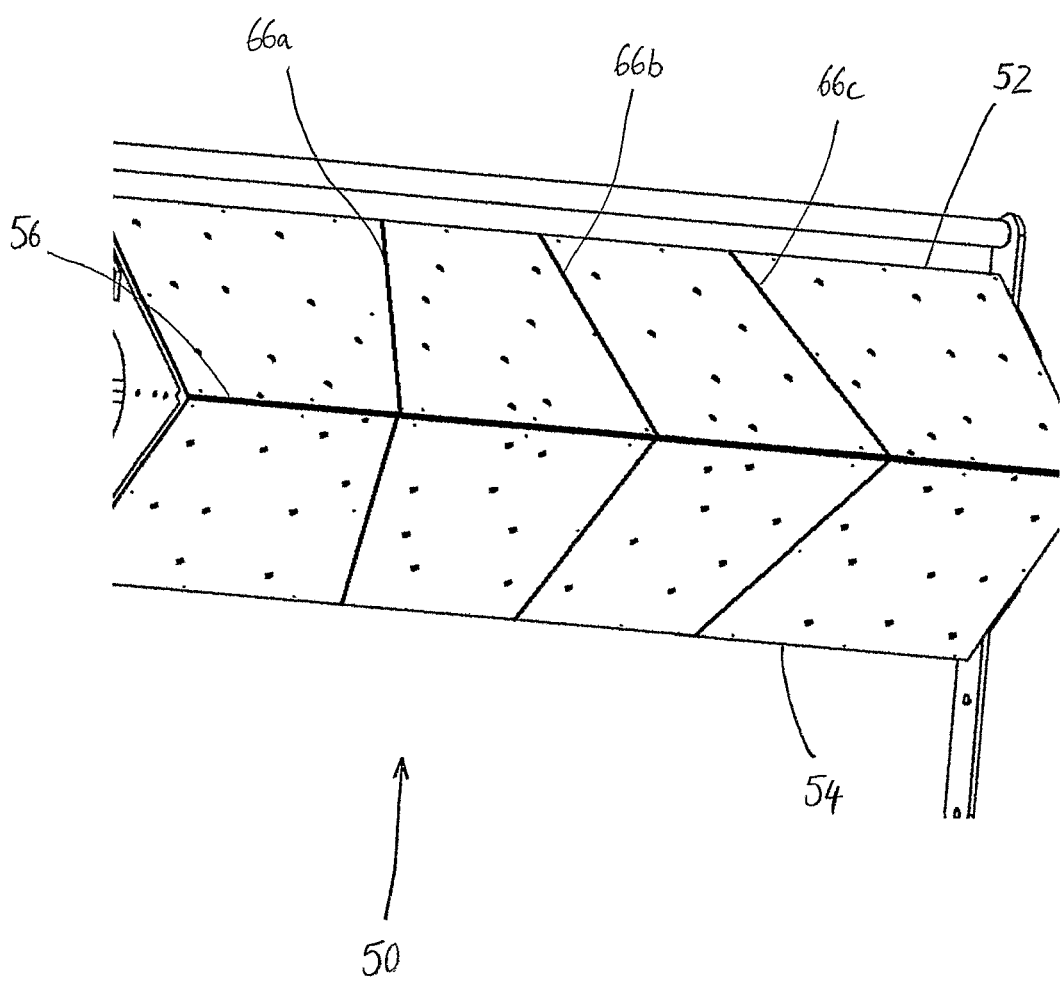
FIG. 11 is a photograph of the calibration device when viewed from another of the cameras incorporated in the system shown in FIGS. 4 and 5 and illuminated by a plurality of fanned lasers.

FIG. 11 depicts the calibration block 50 as viewed by the camera 26b when illuminated by lasers 24b and 24c and showing corresponding laser stripes 66b and 66c. The laser 24a also produces a visible stripe 66a on the calibration block 50 which is in the field of view of camera 26a.

The calibration of the system 22, which enables the location of the lasers 24 and cameras 26 to be determined in a calibration co-ordinate system corresponding to the co-ordinate system of the device 50, is described below. Clearly, the location of the origin of the calibration co-ordinate system is arbitrary. However, it will be appreciated that in practice the calibration process is simplified if the origin is located within the calibration device. In this embodiment, the origin of this co-ordinate system is in the middle of the device.

Broadly speaking, the method of calibration establishes the position and orientation of the cameras 26, and the orientation of the laser planes 28, relative to a common co-ordinate system. In this embodiment, the common co-ordinate system is defined by the calibration block 50 (namely, the calibration co-ordination system), and the equations of the laser planes 28 are defined relative to the calibration co-ordination system.

Accordingly, in this embodiment, the three dimensional location of any point illuminated by a laser stripe 32 on the pantograph head 10 (or any other object) when viewed by one of the cameras 26 can be determined.

As previously stated, each laser 26 emits a corresponding plane of light, i.e. a laser plane 28. The equation of any one of these planes can be expressed in vector form by the equation:

$$n \cdot w = c \qquad \text{[Eqn. 1]}$$

where n is the unit vector normal to the plane, w is a point on the plane and c is a scalar equal to the distance of the point from the origin O of the calibration device.

The orientation of the laser plane 28 is entirely arbitrary. However, it is practical to align it as close as possible to be vertical.

The image produced by each camera 26 is a regular two dimensional rectangular array of pixels. Standard image processing techniques are used to determine locations of items of interest within the array of pixels to sub-pixel accuracy. All references to pixel position or location can be a continuous real number rather than a discrete integer number.

A given pixel position ($p_x$, $p_y$) in the image relates to a single ray in three dimensional space defined by the camera co-ordinate mapping transformation (i.e. camera orientation). This ray will intersect a laser plane 28 in a unique point in three dimensional space. Hence, if the mathematical relationship of the laser plane 28 and the rays from the camera 26 can be defined then the three dimensional position of any point illuminated by the laser can be computed from its corresponding pixel co-ordinates. This is true for all points on the stripes 32a, 32b, 34a, 34b, 36a and 36b traced on the pantograph.

In this analysis it is assumed that the lasers 26 and cameras 24 can be positioned fairly accurately, but not with enough precision to allow a hard-coded transformation between the camera image and the laser position. This transformation is determined by calibration. The accuracy of this system depends on the calibration process rather than the physical camera and laser setup.

Calibration is used to define the relationship between the three dimensional co-ordinate system used (the calibration device co-ordinates) and the two dimensional image co-ordinates.

The system 22 incorporates five co-ordinate systems, as shown in FIG. 12; namely:

Image co-ordinate system: This defines the location of each pixel on the image plane of the camera 26 producing the image. The image plane is parallel to the lens (which corresponds to the x-y plane in the camera co-ordinate system).

Camera co-ordinate system: This is the co-ordinate system of a camera 26 with the origin at the centre of its lens and the z-axis extending directly through the centre of the lens and normal to the lens.

Calibration co-ordinate system: The co-ordinate system defined from the calibration process using the calibration device. For convenience the axes are aligned approximately with the local world co-ordinate system. This helps to relate orientation attributes of the measured object, such as pitch, roll and yaw, to the local co-ordinates.

Pantograph co-ordinate system: The co-ordinate system defined square to the pantograph, with the origin in the centre of the pantograph.

Local world co-ordinate system: The absolute co-ordinate reference system, having a first vertical axis, a second axis parallel to the rails on which the train carrying the pantograph head 10 travels, and a third axis square to the rails.

FIG. 13 shows the relationship between the following three co-ordinate systems:

Calibration (3D) co-ordinate system (designated w);

Camera (3D) co-ordinate system (designated c); and,

Image (2D) co-ordinate system (designated p).

The image co-ordinates of a pixel are related to the camera co-ordinates by:

$$p_x = \frac{c_x}{c_z} = \text{Tan}(\theta_y) \Rightarrow c_x - p_x c_z = 0 \qquad [\text{Eqn. 2}]$$

$$p_y = \frac{c_y}{c_z} = \text{Tan}(\theta_x) \Rightarrow c_y - p_y c_z = 0 \qquad [\text{Eqn. 3}]$$

In which the $c_z$ term is a perspective scaling factor.

The calibration co-ordinates are related to the camera co-ordinates by:

$$\begin{bmatrix} c_x \\ c_y \\ c_z \\ 1 \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & 1 \\ 0 & 0 & 0 & 1 \end{bmatrix} \cdot \begin{bmatrix} w_x \\ w_y \\ w_z \\ 1 \end{bmatrix} (ie\ \underline{c} = H \cdot \underline{w}) \qquad [\text{Eqn. 4}]$$

where H is the matrix which defines the transformation from the calibration co-ordinate system w to the camera co-ordinate system c.

The terms $h_{11}$ to $h_{33}$ define rotation and the terms $h_{14}$, $h_{24}$, $h_{34}$ define translation. If the z-origins of the two co-ordinate systems do not coincide (that is, $h_{34} \neq 0$) then the entire system can be divided by $h_{34}$ to reduce the number of unknowns. This has no effect on $p_x$ and $p_y$ as the numerator and denominators in Equation 1 and Equation 2 have both been divided by $h_{34}$. Therefore the term $h_{34}=1$, as shown in Equation 4. Independent scaling of the pixel co-ordinates is incorporated in H.

Expanding Equation 4 and substituting into Equation 2 and Equation 3 gives two equations, which can be written as a single equation in matrix form, as follows:

$$\begin{bmatrix} w_x & w_y & w_z & 1 & 0 & 0 & 0 & 0 & -p_x w_x & -p_x w_y & -p_x w_z \\ 0 & 0 & 0 & 0 & w_x & w_y & w_z & 1 & -p_y w_x & -p_y w_y & -p_y w_z \end{bmatrix} \cdot \begin{bmatrix} h_{11} \\ h_{12} \\ h_{13} \\ h_{14} \\ h_{21} \\ h_{22} \\ h_{23} \\ h_{24} \\ h_{31} \\ h_{32} \\ h_{33} \end{bmatrix} = \begin{bmatrix} p_x \\ p_y \end{bmatrix} \qquad [\text{Eqn. 5}]$$

The two sets of equations have eleven unknowns. To find a solution requires at least six points on a minimum of two non-parallel planes. Each plane must have at least two points and no three points can be collinear. Of course, more points can be used to apply a least squares fit.

The inverse matrix of H (that is, $H^{-1}$) defines the transformation from camera co-ordinates to calibration co-ordinates.

Each vector corresponding to a ray extending from a respective point through the camera lens passes through the camera origin in the centre of the lens: $\underline{c}_0 = (0, 0, 0, 1)^T$. In the calibration co-ordinate system, the location of the origin of the camera co-ordinate system is given by the vector: $\underline{w}_0 = H^{-1}\underline{c}_0$.

On the camera plane $c_z = 1$, and hence the image co-ordinates $p = (p_x, p_y)$ correspond to $\underline{c}_1 = (p_x, p_y, 1, 1)^T$. In calibration co-ordinates: $\underline{w}_1 = H^{-1} \underline{c}_1$.

Each point in the image corresponds to a ray extending from the centre of the camera lens:

$$\underline{w}(t) = \underline{w}_0 + t \cdot (\underline{w}_1 - \underline{w}_0) \qquad [\text{Eqn. 6}]$$

where $t \geq 0$ is the parametric variable

It will be appreciated that any plane normal to the camera's z-axis can be used instead of the camera plane, in which $c_z=1$. When using an alternative plane the parametric variable will be rescaled.

If the plane in which a point on the object lies is known then the location of that point, in the calibration co-ordinate system, can be determined from the image co-ordinate by the intersection of the ray and the plane (from equation 1, n·w=c), provided the ray and plane are not parallel:

$$t = \frac{c - \underline{n} \cdot \underline{w}_0}{\underline{n} \cdot (\underline{w}_1 - \underline{w}_0)} \qquad [\text{Eqn. 7}]$$

During the calibration process, both surfaces 52 and 54 of the calibration block 50 must be visible by the associated cameras 26 and the laser planes 28 must also intersect both surfaces 52, 54.

The following process can be used to calibrate the system 22:

Move the calibration block 50 to position where it is within each camera's field of view and the various laser stripes intersect it. For convenience the calibration block 50 is orientated approximately square to the rails and in the expected location of the pantograph head 10, as discussed previously.

Determine the transformation matrices for all cameras 26 by using the known position of the dots 62. Each dot 62 is located in pixel co-ordinates to sub-pixel accuracy. At least six dots 62 are required to find the solution for Equation 5 as described above. More points can be used in a least squares fit which also provides a measure of the accuracy of the result.

Use the stripes 66 (see FIG. 9) traced by the lasers 24 on the surfaces 52, 54 to determine the planes 28 of the lasers 24. In this regard, it is noted that three points (which are not collinear) are required to define each plane (ax+by cz=1). This requires that the stripes 66 illuminate at least part of both calibration block 50 surfaces. More than three points may be used for a least squares fit. In vector form, the orientation of each laser plane 28 can be expressed as follows:

$$[a \ b \ c] \begin{bmatrix} x \\ y \\ z \end{bmatrix} = [1] \quad \text{[Eqn. 8]}$$

The three points may be for example for laser plane 28a, two points on the portion of stripe 66a on surface 52 and one point on the portion of stripe 66a on surface 54.

The transformation process uses the information determined by the calibration to calculate the co-ordinates of the pantograph head 10, as seen in an image taken by one of the cameras 26. FIG. 15 defines the orientation of the pantograph head 10 for the system 22 which measures the carbons 14 from the front and back of the pantograph head 10. In FIG. 15, lasers 24d, 24e and 24f are provided for illuminating the back of the pantograph head 10.

The following process describes how the height (which also provides the thickness) of the carbons 14 on the outside of the near beam 12a and the inside of the far beam 12b can be determined using the silhouette of the pantograph head 10 in the image(s) captured by the system 22.

An image of the pantograph head 10 is taken as the train moves past by each of the cameras 26. A triggering mechanism, (such as a mechanical, electro-magnetic or optical, or any other appropriate sensing means) senses when the pantograph head 10 is in the correct position (that is, the trigger location) for the cameras 26 to each take an image.

The two laser stripes 66 are located in each image on the carrier (the images from the two cameras 26a, 26b will share a common laser stripe 66, being the stripe produced by the middle laser 24b). Each laser stripe 66 will form two lines; a first line along the side of the carbon 14 and a second along the side of its corresponding metal section 13. As shown in FIG. 16, the two lines will not be parallel and may be discontinuous. This is due to the laser position, the shape of the metals sections 12 and the camera angle.

The lowest endpoint of each stripe across the metal section 13 provides a known point on the bottom of the near side of the beam 12. It should be noted that the beams 12 are shown in the figures not straight but are manufactured with a curvature, typically of a radius of about 10 meters. However, the curvature may vary for different suppliers. Moreover, the beams could be flat. The present method is applicable to all possible configurations, but is described in relation to curved beams.

Figure 19A:
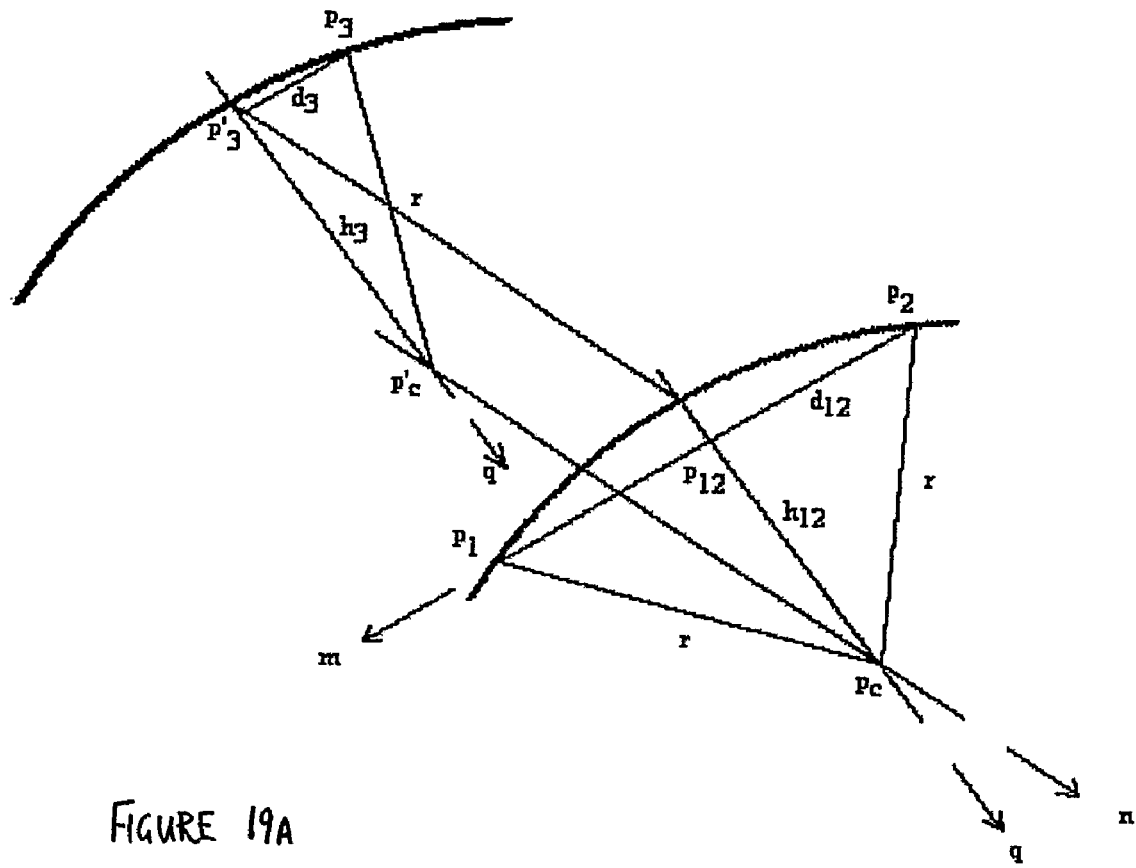
FIGS. 19a and 19b illustrate the geometry in the process of fitting a cylinder to the pantograph head; and, FIG. 20 illustrates the geometry in measuring the thickness or height of the pantograph carbon.
Figure 19B:
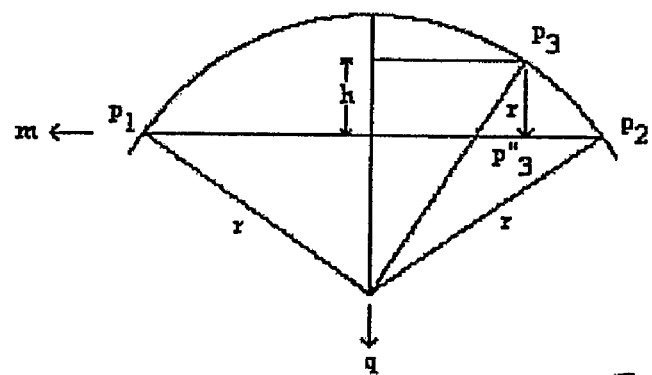
Figure 20:
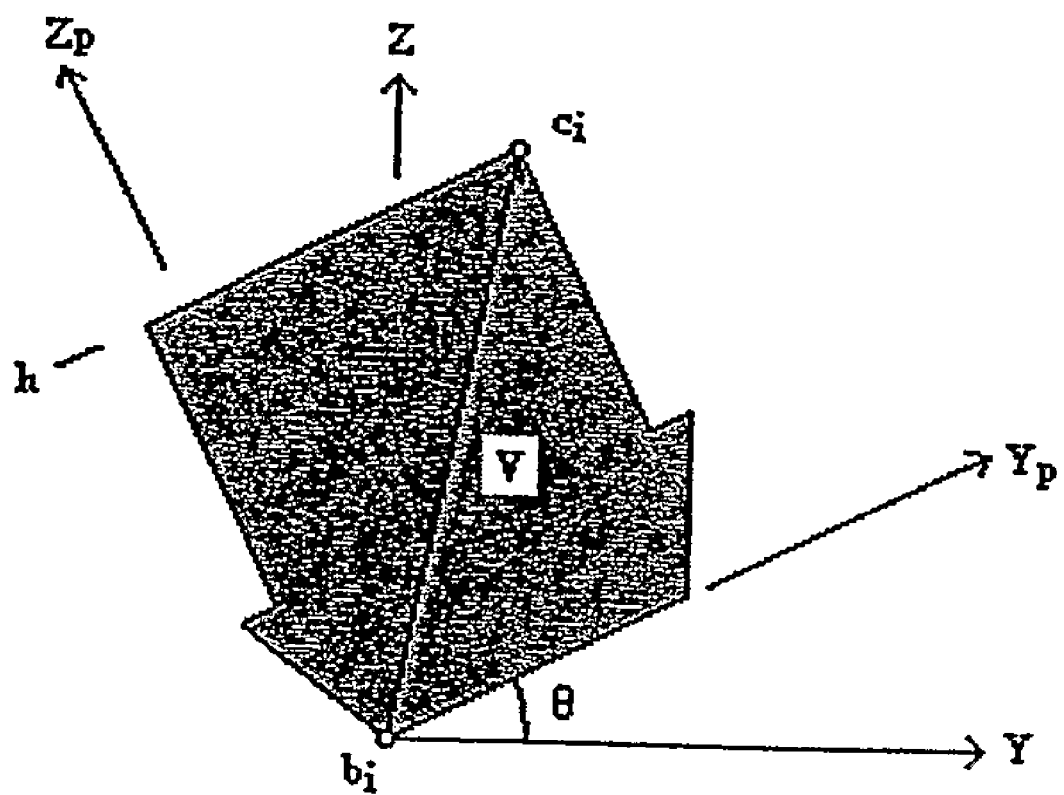

Two pairs of lowest endpoints on each of the near and far beams 12a and 12b allow a cylinder to be fitted to match the curvature of the beams 12 (see FIGS. 17, 19a and 19b). The cylinder's longitudinal axis is normal to the pantograph's x-z plane. The orientation of the cylinder's axis gives the pitch and yaw (relative to the calibration co-ordinate system) of the pantograph head 10.

As shown in FIG. 18, three planes can be defined based upon the cross sectional profile of the pantograph. These three planes are normal to the cylinder's axis, and are each offset from the lowest endpoint on the near side of a beam 12 by fixed distance which is based on the (known) geometry of the metal beams 13. The three planes are defined as follows:

Carbon plane: Along the near face of the carbon 14, with respect to the cameras 26. The location of this plane will allow the 3D co-ordinates of the top near edge $C_i$ of the carbon to be determined from the silhouette.

Carrier plane: Along the far edge of the underside of the carrier, with respect to the cameras 26. The location of this plane will allow the 3D co-ordinates of the bottom far edge $b_i$ of the beam 12 (i.e. metal section 13) to be determined from the silhouette.

Feature plane: Along the underside of the carrier 12, aligned with a feature point, this will allow the location of features to be determined. A feature point is any known point which would appear in the silhouette. For example it may be the location of a bolt passing through the metal section 13.

Each of these planes is defined in calibration co-ordinates.

The co-ordinates of points along the top $C_i$ and bottom $b_i$ of the silhouette of each beam 12a and 12b are determined to sub-pixel accuracy in pixel co-ordinates using standard image analysis techniques.

The pixel co-ordinates of the top $C_i$ of the silhouette also lie in the carbon plane. The intersection of these pixel vectors and the carbon plane is used to transform these silhouette points from pixel co-ordinates to calibration co-ordinates.

The pixel co-ordinates of the bottom $b_i$ of the silhouette also lie in the carrier plane. The intersection of these pixel vectors and the carrier plane is used to transform these silhouette points from pixel co-ordinates to calibration co-ordinates.

The pantograph head pitch determined above by fitting a cylinder is used to rotate the silhouette points from calibration co-ordinates to pantograph co-ordinates.

The pantograph beam height is taken as the vertical difference in the silhouette top $C_i$ and bottom $b_i$ point sets in pantograph co-ordinates. Accordingly, if the physical dimensions of the pantograph carrier 13 are known, the height of the carbons 14 can be determined.

In addition, matching known features from the feature plane on the bottom edge of the carrier will allow the position of the pantograph head 10 to be determined from its profile (in calibration co-ordinates), and the mid point of the carrier to be determined.

The roll of the pantograph head 10 can be determined by fitting a circle to the points in the carrier plane. The relative position of the centre of this circle, in relation to the mid point of the carrier, will determine the roll.

Data from the left and right side images are merged to form a complete profile of the pantograph head 10.

Now that an embodiment of the present invention has been described in detail it will be apparent to those skilled in the relevant arts that numerous modifications and variations may be made without departing from the basic inventive concepts. In particular, the present embodiment is described in relation to a pantograph. However the invention is not limited to application to a pantograph and may be applied to other moving objects such as, for example a wheel of a train. The particular application required will determine the number of fanned lasers and cameras required. If the present system is adapted to measure for example the tread thickness on a train wheel, a single fanned laser producing a laser stripe passing along a radius of the wheel is required.

The calibration block 50 in the embodiment described above has two mutually orthogonal surfaces which intersect at a line for each system 22. However, it will be appreciated that other calibration devices may be employed. For example, a calibration device may have surfaces which are not mutually orthogonal. Alternatively or additionally, a calibration device may have more than two surfaces. It is also possible to use a calibration device in the form of a cylinder. However, it will be appreciated that the complexity of the mathematics associated with establishing a mathematical spatial relationship between the cameras 26 and the laser planes 28 is at least partly dependent on the shape of the calibration device.

Modifications and variations of the present invention which would be obvious to a person of ordinary skill in the art are deemed to be within the scope of the present invention the nature of which is to be determined from the above description and the appended claims.

The invention claimed is:

1. A method for optically determining a physical attribute of an object moving along a defined path, the method comprising the steps of:
    fixing one or more cameras, each camera being located to view the object when the object is at a trigger location;
    fixing one or more fanned lasers, each laser being located outside the path and projecting a laser beam along its laser plane onto the object when the object is at the trigger location, the intersection of the laser plane with the object at the trigger location being visible by at least one of the cameras;
    optically establishing a mathematical spatial relationship between the cameras and the plane of each of the laser beams;
    creating a pixelated image of the object in one or more of the cameras illuminated by the planar laser beams when the object is at the trigger location;
    selecting at least one pixel location in each image, the at least one pixel location corresponding to a point on the object illuminated by a laser beam;
    for each of the selected pixel locations, using the mathematical spatial relationship to establish the three dimensional position of the point based on the two dimensional position of the pixel location;
    using the three dimensional position of the respective point to determine the physical attribute of the object;
    wherein optically establishing a mathematical spatial relationship further comprises:
    establishing an orientation and location of each camera with respect to a co-ordinate system;
    establishing an orientation of each laser plane within the co-ordinate system; and
    deriving a transformation function for calculating the three dimensional position of points within the plane of each respective laser beam from the pixel location within a pixelated image; and,
    wherein establishing an orientation and location of the camera further comprises:
    temporarily mounting a calibration device having at least six non-collinear visible markings at known points on at least two non-parallel surfaces of the calibration device, the calibration device being positioned in the path and in view of each camera at a reference position such that each camera can view the at least six points;
    for each camera, creating a first pixelated image of the calibration device; and
    using the known position of the at least six markings relative to the co-ordinate system and the pixel locations within the first image to establish a transformation equation between pixel locations and the three dimensional co-ordinates of the calibration device at the reference position.

2. A method according to claim 1, wherein establishing an orientation of each laser plane within the co-ordinate system further comprises:
    illuminating the calibration device with each laser beam to form a line along the surface of the calibration device;
    for each camera, creating a second pixelated image of the calibration device; and
    using the position of at least three non-collinear points within the line relative to the co-ordinate system and the pixel locations corresponding to the positions of the points within the second image to establish an equation defining the orientation of the laser.

3. A method according to claim 2, wherein the second pixelated image is the first pixelated image.

4. A method according to claim 1, wherein a pixel location is defined to sub-pixel accuracy using image analysis techniques.

5. A method according to claim 1, wherein the reference position is the trigger location.

6. A method according to claim 1, wherein the two surfaces are planar and at least two points are located on each of the two surfaces.

7. A method according to claim 1, wherein the two surfaces are orthogonal.

8. An optical method for determining a physical attribute of an object moving along a defined path, the method comprising:
    fixing at least one fanned laser at a position outside of the path to project its laser beam onto the moving object when the moving object is at a trigger location;
    fixing at least one camera at a location to view the moving object when illuminated by the laser beam at the trigger location, each camera producing a digital image comprising an array of pixels;
    forming a calibration device comprising two planar surfaces which intersect in a line forming an edge of the device and, at least six non-collinear visible points on the planar surfaces at known locations on the calibration device defining a calibration co-ordinate system;
    temporarily mounting the calibration device in the path in view of the at least one camera, and where illuminated by the at least one fanned laser;
    producing an image of the device on each camera and determining for each of one or more pixel locations within the image an equation in terms of the calibration co-ordinate system, of a ray passing through a centre of lens of the camera which, when projected onto the device coincides with the pixel location;
    determining an equation of a plane in the calibration co-ordinate system containing the fanned laser beam;
    removing the calibration device;
    taking an image of the object when illuminated by the at least one laser beam at the trigger location and utilising the laser plane equations, determining a three dimensional location in the calibration co-ordinate system of selected pixel locations of the object illuminated by the at least one laser, and from the three dimensional locations determining physical attribute of the object;
    wherein forming the calibration device further comprises providing a third planar surface having a first edge coincident with an edge of the first planar surface distant the second planar surface, and a fourth planar surface having a first edge coincident with an edge of the third planar surface distant the first planar surface, and a second edge coincident with an edge of the second planar surface distant the first planar surface.

9. An optical method according to claim 8, wherein forming the calibration device further comprises arranging the first and second planar surfaces at right angles to each other.

10. An optical method according to claim 8, wherein the second and third planar surfaces are parallel to each other and the first and fourth planar surfaces are parallel to each other.

11. An optical method according to claim 8, wherein fixing the at least one fanned laser comprises fixing two or more fanned lasers at respective locations outside of the path whereby the laser beams from each laser projects onto the moving object at different locations.

12. An optical method according to claim 8, wherein fixing the at least one camera comprises fixing two or more cameras such that each camera is able to view the intersection of at least two laser beams with an object at the trigger location.

13. A method according to claim 8, wherein a pixel location is defined to sub-pixel accuracy using image analysis techniques.

14. A method for optically establishing a mathematical spatial relationship between one or more cameras and one or more fanned lasers each capable of projecting a laser beam along a laser plane, the method comprising:
    establishing an orientation and location of each camera with respect to a co-ordinate system;
    establishing an orientation of each laser plane within the co-ordinate system; and
    deriving a transformation function for calculating the three dimensional position of points within the plane of each respective laser beam from a pixel location within a pixelated image created by each of the cameras;
    wherein establishing an orientation and location of each camera further comprises:
    temporarily mounting a calibration device having at least six non-collinear visible markings at known points on at least two non-parallel surfaces of the calibration device, the calibration device being positioned in the path and in view of the cameras at a reference position such that each camera can view the at least six points;
    for each camera, creating a first pixelated image of the calibration device; and
    using the known position of the at least six markings relative to the co-ordinate system and the pixel locations within the first image to establish a transformation equation between pixel locations and the three dimensional co-ordinates of the calibration device at the reference position; and
    wherein establishing an orientation of each laser plane within the co-ordinate system further comprises:
    illuminating the calibration device with each laser beam to form a line along the surface of the calibration device;
    for each camera, creating a second pixelated image of the calibration device; and
    using the position of at least three non-collinear points within the line relative to the co-ordinate system and the pixel locations corresponding to the positions of the points within the second image to establish an equation defining the orientation of the laser.

15. A method according to claim 14, wherein the second pixelated image is the first pixelated image.

16. An optical method for determining a dimension or orientation of an object moving along a defined path, the method comprising:
    fixing at least one fanned laser at a position outside of the path to project its laser beam onto the moving object when the moving object is at a trigger location;
    fixing at least one camera at a location to view the moving object when illuminated by the laser beam at the trigger location, each camera producing a digital image comprising an array of pixels;
    forming a calibration device comprising two planar surfaces which intersect in a line forming an edge of the device and, at least six non-collinear visible points on each of the planar surfaces at known locations on the calibration device defining a calibration co-ordinate system;
    temporarily mounting the calibration device in the path at a fixed position and in view of the at least one camera, and where illuminated by the at least one fanned laser;
    producing an image of the calibration device on each camera and determining for each of one or more pixel locations within the image a ray equation in terms of the calibration co-ordinate system, of a ray passing through a centre of lens of the camera which, when projected onto the device, coincides with the pixel location;
    illuminating the calibration device by the or each fanned laser to produce for each laser a line on each of the two planar surfaces;
    taking an image of the laser illuminated calibration device and from this determining a laser plane equation in the calibration co-ordinate system containing the fanned laser beam;
    removing the calibration device; and,
    taking an image of the object with the or each camera when illuminated by the at least one laser beam at the trigger location and utilising the ray equations and the laser plane equations, determining a three-dimensional location in the calibration co-ordinate system of selected pixel locations of the object illuminated by the at least one laser, and from the three-dimensional locations determining the dimension or orientation of the object.

17. The method according to claim 16, wherein determining the dimension or orientation of the object comprises selecting at least one pixel location from two or more different parallel planes on the object.

18. The method according to claim 16, wherein fixing at least one fanned laser and fixing at least one camera comprises fixing the or each camera at a different height to each of the at least one fanned laser.

19. The method according to claim 16, wherein fixing at least one fanned laser and fixing at least one camera comprises fixing the or each camera in a manner so that a ray passing through an origin of a lens of the camera is not parallel to a plane containing the fanned laser beam of any of said at least one fanned laser.

20. An optical method according to claim 16, wherein forming the calibration device further comprises arranging the first and second planar surfaces at right angles to each other.

21. An optical method according to claim 16, wherein fixing at least one fanned laser comprises fixing two or more fanned lasers at respective locations outside of the path whereby laser beams from each laser projects onto the moving object at different locations.

22. An optical method according to claim 16, wherein fixing at least one camera comprises fixing two or more cameras such that each camera is able to view an intersection of at least two laser beams with an object at the trigger location.

23. A method according to claim 16, wherein the selected pixel locations are defined to sub-pixel accuracy using image analysis techniques.

24. A method according to claim 16, wherein the fixing at least one formed laser comprises fixing two or more fanned lasers at respective positions where the fanned lasers project their respective laser beams onto the object from opposite directions; and wherein the fixing at least one camera comprises fixing cameras at location to view the laser beams projected onto the object from the opposite direction; and wherein forming the calibration device further comprises providing a third planar surface having a first edge coincident with an edge of the first planar surface distant the second planar surface, and a fourth planar surface having a first edge coincident with a edge of the third planar surface distant the first planar surface, and a second edge coincident with an edge of the second planar surface distant the first planar surface, wherein said third and fourth surfaces defining a second calibration co-ordinate system having a known spatial relationship relative to the calibration co-ordinate system.

25. An optical method according to claim 24, wherein the second and third planar surfaces are parallel to each other and the first and fourth planar surfaces are parallel to each other.

* * * * *